United States Patent [19]
Princell

[11] 3,996,966
[45] Dec. 14, 1976

[54] DISPOSABLE END CLOSURE

[76] Inventor: William E. Princell, 10803 Wildwood Drive, Indianapolis, Ind. 46256

[22] Filed: Apr. 8, 1976

[21] Appl. No.: 674,859

[52] U.S. Cl. .............................. 138/89; 138/96 R; 220/266; 220/270; 220/356
[51] Int. Cl.$^2$ ......................................... F16L 55/10
[58] Field of Search .......... 220/266, 270, 307, 356, 220/DIG. 19; 138/89, 96 R, 109; 215/253, 254

[56] References Cited
UNITED STATES PATENTS

| | | | |
|---|---|---|---|
| 3,403,812 | 10/1968 | Weber | 220/266 |
| 3,780,773 | 12/1973 | Haugen | 138/89 |
| 3,948,290 | 4/1976 | Arisland | 138/89 |

Primary Examiner—George T. Hall
Attorney, Agent, or Firm—Jenkins, Hanley & Coffey

[57] ABSTRACT

A disposable end closure for pipe and tube ends such as, for example, vehicle fuel filler openings. The disposable end closure includes a cylindrical portion for inserting axially into the open end of the pipe or tube. The cylindrical portion has an outside diameter slightly smaller than the inside diameter of the pipe or tube. At the axially outer end of the cylindrical portion is a first flange which extends radially outwardly from the cylindrical portion. The axially inner end of the cylindrical portion is closed. A second flange extends radially outwardly from the sidewall of the cylindrical portion and engages the inner wall of the pipe or tube axially inwardly from the end thereof. The closure for an automobile fuel filler neck is preferably molded of a resilient plastic material and a pair of parallel chordally extending tear lines are molded, scored, or otherwise formed in the axially inwardly facing surfaces of the first flange, the radially outwardly facing sidewall of the cylindrical portion and the axially inwardly facing wall of the closed lower end. The tear lines are substantially continuous across the first flange, cylindrical portion and closed inner end so that a region is defined between the tear lines, which region desirably extends transversely a substantial distance across the end closure. The region may be gripped by a tool near the outer periphery of the first flange and torn away from the end closure between the webs. The remaining portion of the end closure may then be deformed slightly for easy removal from the pipe or tube end.

10 Claims, 6 Drawing Figures

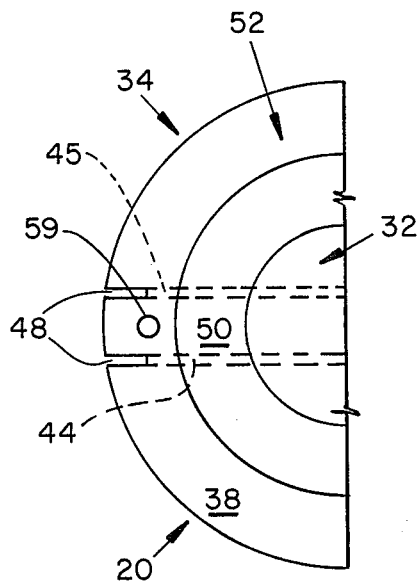
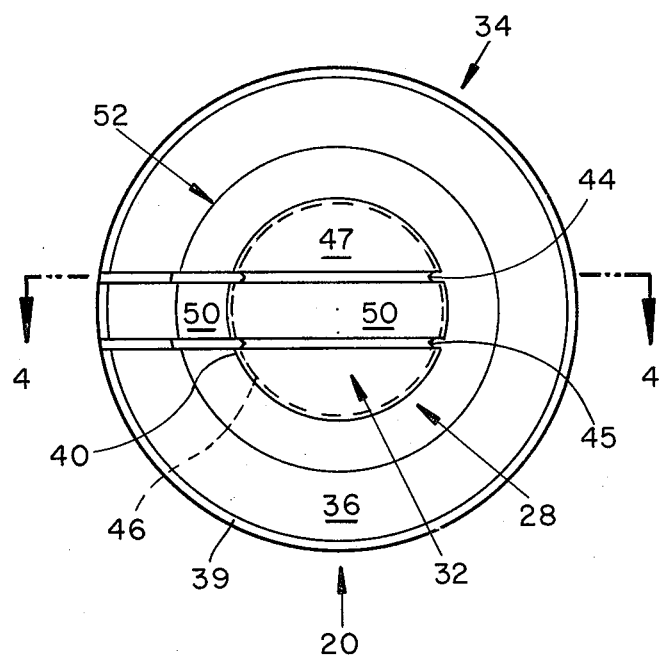
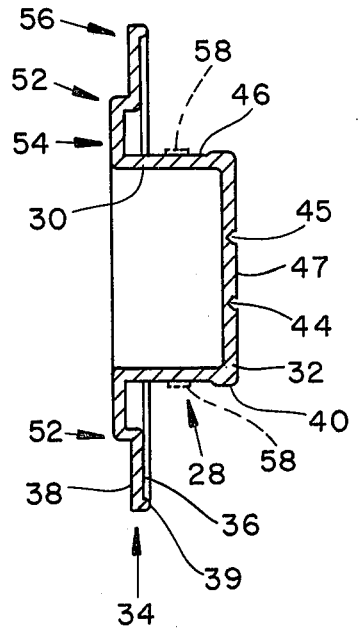
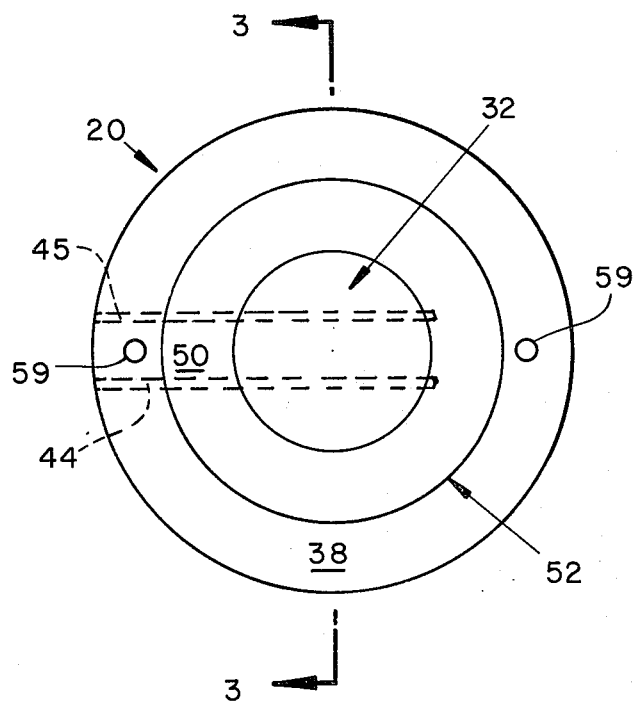
FIG. 1a   FIG. 2
FIG. 3   FIG. 1

DISPOSABLE END CLOSURE

This invention is useful for providing economical, temporary end closures for pipe and tube ends. The invention is especially useful, for example, to provide temporary end closures for vehicle fuel filler necks.

In many situations, it is necessary and desirable to provide an inexpensive, easy-to-use, and easy-to-remove end closure for a pipe or tube end. For example, many automobile dealers are plagued by theft and loss of caps from the ends of the fuel filler necks of automobiles left outside of dealer showrooms on lots. Such lots are frequently easily accessible to the public and unauthorized persons remove fuel filler neck caps from such automobiles. Additionally, many automobiles kept by dealers for customer demonstration purposes, e.g., "test driving," are accessible to the general public in the ordinary course of their use. Caps can be stolen from these demonstration automobiles when the automobiles are being driven on the streets.

Replacement of lost and stolen fuel filler neck caps can result in considerable expense to the dealer. Additionally, the threat of such loss or theft frequently requires dealers to stock large inventories of the various types of fuel filler neck caps required by the different automobiles they sell.

In response to these problems, dealers frequently remove the caps provided as standard equipment on the automobiles they receive from manufacturers and close the ends of the fuel filler necks of such automobiles with other materials, e.g., masking tape. Of course, such solutions are frequently unsatisfactory. These other materials generally can be removed easily, allowing contaminants to enter the fuel tanks of such automobiles. Further, the easy removal of these makeshift fuel filler neck end closures from automobiles left outside a dealer's showroom can make theft of fuels from such automobiles a threat.

Thus, it is an object of the present invention to provide a temporary end closure for pipe and tube ends which is economical, easy to install and provides a satisfactory temporary end closure. This temporary end closure may be removed without a great deal of difficulty by a person using simple tools in a sufficiently short time. The closure, being relatively inexpensive and being rendered relatively useless upon removal from the automobile filler neck, is substantially less likely to be stolen than the filler neck caps with which automobiles are equipped by manufacturers. Its inexpensiveness allows it to be acquired in sufficient quantities at modest costs by dealers so that, as the dealers receive shipments of new cars, they can remove and store the original equipment fuel filler neck caps, replacing them with end closures made in accordance with the present invention. These temporary end closures can be removed and replaced with the original equipment closures when the cars are sold.

The temporary end closure of the present invention is also useful in many other situations in which an economical, easy-to-remove temporary end closure for a pipe or tube end is desired.

In accordance with the invention, a disposable device is provided for insertion axially into a pipe or tube for closing the pipe or tube end. The end closure desirably comprises an axially elongated portion having a cross section with the same shape as, and a slightly smaller size than, the cross section of the pipe. The axially elongated portion is inserted axially into the pipe end. The elongated portion includes a sidewall and a closed axially inner end. A first flange has axially inner and outer surfaces and extends radially outwardly from the axis of the elongated portion. The first flange is attached to the axially outer end of the elongated portion to prevent axial insertion of the elongated portion into the pipe end beyond the first flange. A second flange extends radially outwardly of the elongated portion axis from the outer surface of the sidewall to engage the inner wall of the pipe. The device includes at least one tear line extending across a portion of the first flange, along the sidewall of the elongated portion and partly across the closed axially inner end. The tear line allows the closure to be torn. After tearing, the closure may be deformed slightly so that it may be easily removed from the pipe end.

Further in accordance with the invention, the tear line is molded, scored or otherwise formed in the axially inner surface of the first flange, the radially outer surface of the elongated portion sidewall, and the axially inner surface of the closed axially inner end. When the tear line is so disposed, it is "blind", i.e., its location cannot be readily ascertained when the closure is installed in a pipe end and viewed from axially outwardly of the pipe end.

Further in accordance with the invention, two such tear lines can be provided in the temporary end closure. A tab region is thus defined between the tear lines, which tab region can be gripped near the outer perimeter of the first flange and torn away from the end closure, removing portions of the first flange, the sidewall and the axially inner end. This removal of the tab region allows the remaining portion of the end closure to be deformed slightly for easy removal from the pipe end.

In a preferred embodiment, the pipe end is the outer end of an automobile fuel filler neck. The lip of the filler neck extends a first distance above the automobile body panel through which it protrudes. The axially inner surface of the end closure first flange includes a portion for engaging the lip of the filler neck and a second portion located radially outwardly of the filler neck axis from the first portion and axially inwardly therefrom for fitting against a contoured body panel of the automobile and making the temporary closure less susceptible to tampering. The closure is desirably molded from a low density polyethylene plastic.

The accompanying drawings illustrate the invention. In the drawings:

FIG. 1 is a top plan view of an end closure constructed in accordance with the present invention;

FIG. 1a is a fragmentary top plan view of an alternative construction detail of the end closure of FIG. 1;

FIG. 2 is a bottom plan view of the end closure of FIG. 1;

FIG. 3 is a sectional view of the end closure of FIGS. 1-2 taken along section lines 3—3 of FIG. 1;

Figure 4:
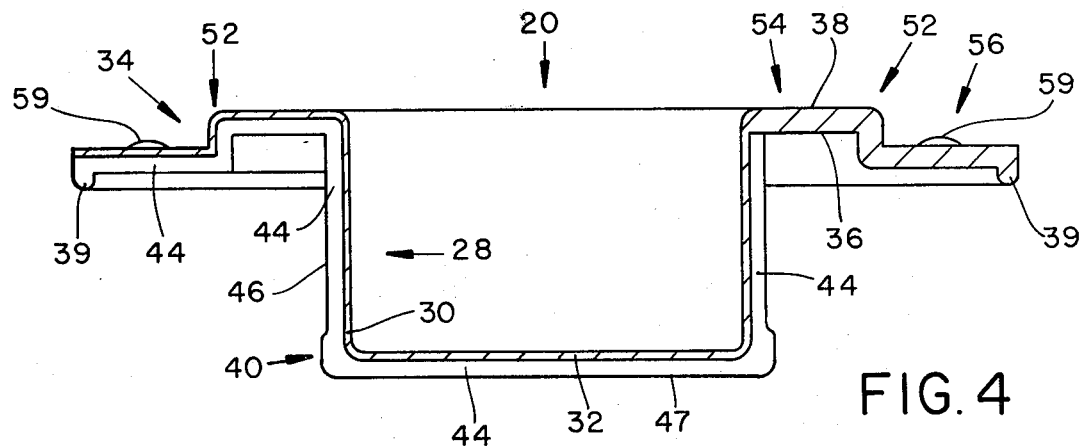
FIG. 4 is a sectional view of the end closure of FIGS. 1-3 taken along section lines 4—4 of FIG. 2; and, FIG. 5 is a side elevational view of the end closure of FIGS. 1-4.

In a preferred embodiment of the present invention, a disposable end closure 20 closes the end of a fuel filler pipe 22 (FIG. 5) by abutting the axially outer lip 24 of the pipe, which lip 24 protrudes outwardly from a contoured vehicle body panel 25.

The disposable end closure 20 is inserted axially into the axially facing open end 26 of pipe 22. Closure 20 includes an axially elongated portion 28 which, desirably, has a section transversely of the elongated portion 28 and pipe 22 axes which is the same shape as, and slightly smaller in size than, the cross section of the pipe 22. In the illustrated embodiment, axially elongated portion 28 is cylindrical in cross section. Cylindrical portion 28 is defined by a sidewall 30 and a closed axially inner end 32. A first flange 34 is disposed at the axially outer end of cylindrical portion 28. The first flange has an axially inner surface 36 and an axially outer surface 38. Axially inner surface 36 desirably sealingly abuts or engages outer lip 24 of pipe 22 (FIG. 5) to close the fuel filler pipe. First flange 34 extends radially outwardly of the cylindrical portion 28 axis from the axially outer end of cylindrical portion 28 to prevent axial insertion of cylindrical portion 28 into axially facing open end 26 of pipe 22 beyond the limit permitted by an axially inwardly extending annular ring 39 of material formed at the outer periphery of flange 34 on the axially inner surface 36 thereof.

The end closure 20 further includes a second flange 40 extending radially outwardly from the axially inner end of cylindrical portion 28 where sidewall 30 joins closed axially inner end 32. Second flange 40 extends radially outwardly to engage the inner wall 42 of pipe 22 (FIG. 5), thereby to aid in securing closure 20 firmly in pipe 22. Second flange 40 desirably constitutes a radially raised portion of sidewall 30 at the junction of sidewall 30 with closed axially inner end 32.

The end closure 20 further includes a pair 44, 45 of chordally extending parallel molded or scored tear lines. Tear lines 44, 45 are desirably placed in the axially inner surface 36 of first flange 34, through radially outer surface 46 of sidewall 30 and the axially inner surface 47 of closed axially inner end 32. The tear lines 44, 45 are thus "blind," i.e., their locations cannot readily be discerned when closure 20 is inserted into end 26 and viewed from axially outwardly of end 26. It is frequently desirable to form tear lines 44, 45 in the closure 20 so that they are blind to discourage persons from tearing the closure and removing it from end 26 without first taking time to inspect the closure 20 carefully to determine the locations of tear lines 44, 45. This blind feature acts as a deterrent against tampering with the closure 20. Optionally, portions 48 of tear lines 44, 45 near the outer periphery of first flange 34 can be removed as indicated in the detail of flange 34 illustrated in FIG. 1a.

A tab region 50 formed between tear lines 44, 45 desirably extends across first flange 34, axially inwardly along sidewall 30, across second flange 40, all of the way across axially inner surface 47, and axially outwardly along sidewall 30. Preferably, the tear lines 44, 45 are continuous and unbroken across flange 34, sidewall 30, second flange 40, and axially inner surface 47 of end 32 (see FIG. 4). Tear lines 44, 45 and tab region 50 formed therebetween allow end closure 20 to be torn along lines 44, 45 so that it may be easily removed from end 26 when necessary.

Figure 5:
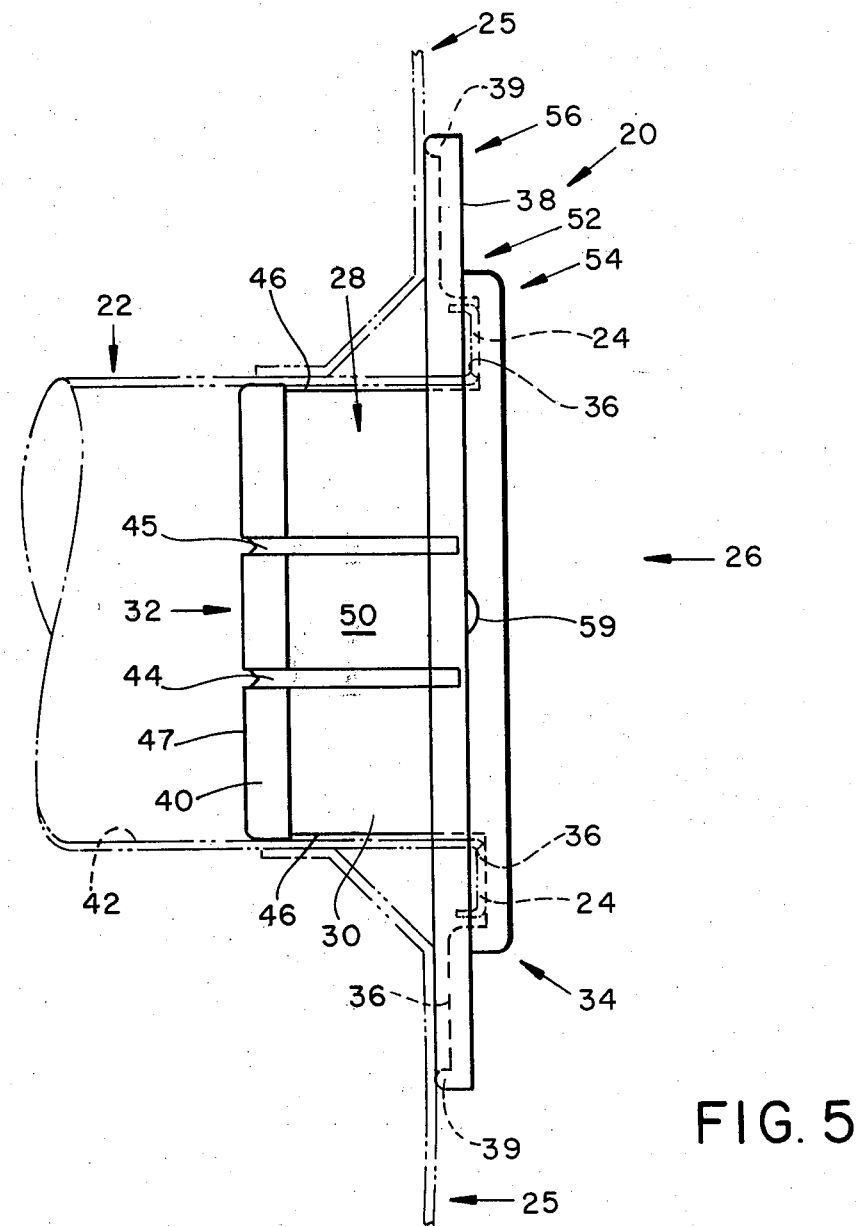

As illustrated in FIGS. 3–5, first flange 34 includes a step 52 on axially inner surface 36, and preferably, also on axially outer surface 38, thereof. Step 52 divides axially inner surface 36 into a first, radially inner and axially outer portion 54 for sealingly abutting or engaging lip 24 (FIG. 5) and a second, radially outer and axially inner portion 56. Portion 56 can be molded or otherwise formed so that annular ring 39 will fit against the contoured vehicle body panel 25 (see FIG. 5), which may be recessed, as illustrated generally at 57, in the vicinity of the location through which pipe 22 protrudes. This desirable contour-fitting feature of region 56 and ring 39 acts as a further deterrent against tampering with end closure 20 by unauthorized individuals.

First flange 34 further desirably includes, on outer surface 38 thereof, a plurality of knobs or protrusions 59 which can be of assistance to the person installing the closure in pipe end 26. Protrusions 59 provide a means for turning the closure slightly as it is inserted into end 26.

Axially elongated cylindrical portion 28 can further include a third flange 58 (shown in broken lines in FIG. 3) which extends radially outwardly from the radial outer surface 46 of sidewall 30 intermediate the first and second flanges 34, 40, respectively. Third flange 58 can be provided to assist second flange 40 in holding the end closure 20 securely and tightly in pipe 22, third flange 58 extending radially outwardly to abut inner wall 42 of the pipe.

It must be noted that a single line such as tear lines 44, 45 can be molded or otherwise formed in end closure 20. Such a single tear line would allow closure 20 to be torn in a manner substantially as explained above, the torn closure 20 then being deformed or collapsed to allow it to be removed readily from pipe 22.

What is claimed is:

1. A disposable end closure for insertion into a pipe for closing the axially facing end of the pipe, the pipe having a lip at its axially outer, open end and a first cross section, the closure comprising an axially elongated portion for insertion into the pipe end, the elongated portion having a sidewall and a closed axially inner end, a first flange for engaging the lip of the pipe end, the first flange extending radially outwardly of the elongated portion axis from the axially outer end of the elongated portion to prevent axial insertion of the elongated portion into the pipe end beyond the first flange, a portion for engaging the inner wall of the pipe, the wall-engaging portion being located axially inwardly of the first flange on the elongated portion, and at least one tear line for allowing the closure to be torn so that the closure may be removed from the pipe end, the tear line extending across a portion of the first flange and across the wall-engaging portion a sufficient distance to allow the wall-engaging portion to be collapsed slightly for easy removal of the closure from the pipe end.

2. An end closure according to claim 1 wherein the wall-engaging portion comprises a second flange which extends radially outwardly from the axially inner end of the elongated portion and the tear line extends continuously from the sidewall across the second flange onto the closed axially inner end.

3. An end closure according to claim 2 wherein the tear line is placed in the axially inner surface of the first flange, the radially outer surface of the elongated portion sidewall and the axially inner surface of the closed axially inner end, so that the location of the tear line cannot be readily ascertained when the closure is installed in a pipe end and viewed from axially outwardly of the pipe end.

4. An end closure according to claim 2 including two such tear lines providing a tab region of the end closure therebetween so that the tab region can be gripped near the outer perimeter of the first flange and torn away from the end closure along the tear lines, removing portions of the first flange, the sidewall and the axially inner end and allowing the remaining portion of the end closure to be deformed slightly for removal from the pipe end.

5. An end closure according to claim 1 wherein the pipe end is the outer end of an automobile fuel filler neck, the lip of the filler neck extending a first distance above the automobile body panel through which it protrudes.

6. An end closure according to claim 5 wherein the axially inner surface of the first flange includes a first portion for sealingly engaging the lip of the filler neck and a second portion for fitting against the contoured body panel, the second portion having a peripheral annular ring which extends axially inwardly from the second portion toward the body panel, the second portion being located radially outwardly of the elongated member axis from the first portion and axially inwardly from the first portion.

7. An end closure according to claim 2 and further comprising a third flange for engaging the inner wall of the pipe, the third flange extending radially outwardly of the elongated member axis from the outer surface of the elongated member sidewall intermediate the first and second flanges.

8. In a resilient disposable closure for insertion axially into a pipe for sealing the end thereof, the pipe having a circular cross section, a lip formed on the axially outer end thereof, and a first inside diameter, the end closure comprising a cylindrical portion for insertion axially into the pipe end, the cylindrical portion having a sidewall with an outside diameter slightly smaller than the first diameter, a closed axially inner end, a first flange for engaging the lip of the pipe end, the first flange having axially inner and outer surfaces and extending radially outwardly from the axially outer end of the elongated portion to prevent axial insertion of the cylindrical portion into the pipe end beyond the first flange, a second flange for engaging the inner sidewall of the pipe, the second flange extending radially outwardly of the cylindrical portion axis from the axially inner end of the cylindrical portion, the second flange having a diameter substantially equal to the first diameter, the improvement comprising a tear line for allowing the closure to be torn so that the closure may be removed from the pipe end, the tear line extending from the radially outer perimeter of the first flange inwardly toward the cylindrical portion axis, then along the cylindrical portion sidewall and the closed axially inner end.

9. The improvement of claim 8 further including another such tear line, a tab region thus being formed between the two tear lines, which tab region can be gripped near the outer perimeter of the first flange and torn away from the end closure so that the remaining portion of the end closure can be removed.

10. The improvement of claim 8 and further including a third flange disposed intermediate the first and second flanges and extending radially outwardly from the sidewall of the cylindrical portion, the third flange having a diameter equal to the first diameter to engage the inner wall of the pipe.

* * * * *